METHOD FOR PREPARING PHOSPHONO-ALCOHOLS

William M. Le Suer, Cleveland, Ohio, assignor to The Lubrizol Corporation, Wickliffe, Ohio
No Drawing. Filed Feb. 8, 1961, Ser. No. 87,768
12 Claims. (Cl. 260—461)

This invention relates to polyphosphono-substituted polyols and to a process for preparing the same. In a more particular sense this invention relates to such polyols characterized by more than one carbon atom to which are attached both a phosphono radical and an alcoholic radical.

Phosphono-substituted alcohols in which the phosphono radical and an alcoholic radical are attached to the same carbon atom have been prepared by the reaction of an organic phosphite with a carbonyl carbon such as an aldehyde or a ketone. The reaction is exemplified by the formation of 2-dimethylphosphono-2-propanol from di-methyl phosphite and acetone. It has been known, however, that such reaction is limited to the formation of mono-phosphono-substituted alcohols. Thus, prior art workers have attempted the preparation of polyphosphono-substituted polyols by the reaction of bi-acetyl or actylacetone with an organic phosphite, but have succeeded in causing reaction of the phosphite with only one of the two carbonyl groups of the diketone reactant to produce a mono-phosphono-substituted alcohol containing an unused carbonyl group. The corresponding diphosphono-substituted diols are not obtained.

It is, accordingly, a principal object of this invention to provide polyphosphono-substituted polyols.

It is also an object of this invention to provide a process for preparing polyphosphono-substituted polyols characterized by the attachment of a phosphono radical and an alcoholic radical to the same carbon atom.

These and other objects are attained in accordance with this invention by providing a process which comprises the reaction of an organic phosphite with an alpha, delta-di-oxo-substituted hydrocarbon in the presence of a small amount of an alkaline catalyst. The product of this process is an alpha,delta-diphosphono-alpha,delta-diol. The reaction of the above process is illustrated by the reaction of dimethyl phosphite with 2,5-hexadedione as represented by the following equation:

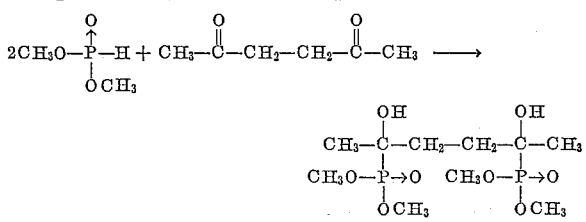

The reaction can be carried out at any temperature below the decomposition point of the components of the reaction mixture. Ordinarily a temperature within the range from about room temperature to about 200° C. is preferred. A temperature below about 0° C. may likewise be used. In some instances the reaction is exothermic and external cooling may be required in order to maintain the reaction temperature within the desired range.

Only a very small amount of an alkaline catalyst is needed to cause the formation of the desired product. Such amount may be as little as 0.001 mole or even less per mole of either the phosphite or the di-oxo-hydrocarbon used. The preferred amount is in the neighborhood of 0.001–0.05 mole per mole of the phosphite. Greater amounts of the catalyst may be used but appear to offer little additional benefits.

The relative proportions of the phosphite to the di-oxo-hydrocarbon to be used in the reaction appear not to be critical, despite the apparent stoichiometric requirement of 2 moles of the phosphite for each mole of a di-oxo-hydrocarbon for the formation of the polyphosphono-substituted polyols. Thus, when less than 2 moles of the phosphite are used for each mole of the di-oxo-hydrocarbon, the only product obtained from such reaction is a diphosphono-substituted diol and in no instances is there obtained the corresponding monophosphono-substituted alcohol containing an unused carbonyl group. However, in order to obtain a maximum utilization of the reactants, a molar ratio of 2 to 1 for the phosphite to the di-oxo-hydrocarbon is preferred. It will be noted that when an excess of the phosphite reactant is used the excess will simply remain as a diluent in the reaction mixture.

The organic phosphites useful in the process of this invention include mono and di-substituted phosphites in which the substituents may be alkyl, cycloalkyl, aryl, aralkyl, or alkaryl radicals. The phosphites may be obtained by any known method such as one involving the reaction of an alcohol or a phenol with phosphorus trichloride. Specific examples of the phosphite include dimethyl phosphite, diethyl phosphite, dicyclohexyl phosphite, didodecyl phosphite, methyl hexyl phosphite, cyclic ethylene phosphite, cyclic 1,3-trimethylene phosphite, n-hexyl decyl phosphite, diphenyl phosphite, phenyl phosphite, p-butylphenyl phosphite, alpha-naphthyl phosphite, di-beta-naphthyl phosphite, di-xenyl phosphite, dibenzyl phosphite, 2-phenylbutyl phosphite, di-(polyisobutene (molecular weight 1000)-substituted phenyl) phosphite. For reasons of economy and the particular efficacy for use in the above process the dialkyl phosphites in which the alkyl radical contain from 1 to about 30 carbon atoms are preferred.

It will be noted that since a mono-substituted phosphite is acidic it will consume a stoichiometrically equivalent amount of the alkaline catalyst to form a metal salt. Consequently when a mono-substituted phosphite is used in the above process the amount of the alkaline catalyst must be sufficiently large so as to provide for both the salt formation and the catalytic action for the formation of the polyphosphono-substituted polyols.

The alpha,delta-di-oxo-hydrocarbons useful in the above process may be di-aldehydes, di-ketones, or keto-aldehydes. The terms "alpha" and "delta" as used herein define the relative positions of the two carbonyl groups but do not necessarily define the positions of these carbonyl groups with respect to other carbon atoms in the hydrocarbon chain. Thus, "alpha,delta-di-oxo-hydrocarbons" designate compounds characterized by a di-oxo-tetramethylene radical in which the two oxo-substituted carbon atoms are separated by two methylene groups. Alkanediones having from 6 to about 30 carbon atoms are especially preferred. Examples of the alpha,delta-di-oxo-hydrocarbons include 1,4-butanedial, 4-ketopentanal, 2,5-hexanedione, 1,4-cyclohexanedione, 3,6-decanedione, 2,5 - dodecanedione, 4,7 - dimethyl - 3,6-nonanedione, 3-chloro-2,5-heptanedione, and the like.

The alkaline catalyst is for the most part an inorganic basic alkali or alkaline earth metal compound such as the metal hydroxide, metal oxide, metal carbonate, metal alcoholate, metal phenate, metallo-hydrocarbon compound, or the elemental metal. It is exemplified by sodium hydroxide, potassium hydroxide, barium oxide, calcium hydroxide, sodium methoxide, potassium ethoxide, potassium phenate, sodamide, sodium acetylacetonate, metallic sodium, metallic potassium, metallic barium, and lithium butyl. Metallic sodium is especially preferred because of its high catalytic activity in the process of this invention.

The following examples are illustrative of the process of this invention:

*Example 1*

To a mixture of 50 grams of diethyl phosphite and 41.5 grams of 2,5-hexanedione there is added 0.1 gram of sodium. The reaction is exothermic and the temperature rises spontaneously to 81° C. in 5 minutes. The resulting mixture is cooled to room temperature whereupon a solid is precipitated. The solid is separated by filtration, washed with diethyl ether, and recrystallized from dioxane. The recrystallized product is 2,5-bis(di-n-ethylphosphono)-2,5-hexanediol and is found to have a phosphorus content of 15.4%, a carbon content of 43.5%, and a hydrogen content of 8.14%.

*Example 2*

The procedure of Example 1 is repeated except that diisopropyl phosphite (83 grams) is used in lieu of the diethyl phosphite used. The product is 2,5-bis-(di-isopropyl phosphono)-2,5-hexanediol and is found to have a phosphorus content of 13.4%.

*Example 3*

The procedure of Example 1 is repeated except that diisobutylphosphite (97 grams) is used in lieu of the diethyl phosphite used. The product is 2,5-bis-(di-isobutylphosphono)-2,5-hexanediol and is found to have a phosphorus content of 12% and a hydroxyl content of 6.2%.

*Example 4*

A mixture of 46.8 grams of diphenyl phosphite, 11.4 grams of 2,5-hexanedione, and 0.1 gram of sodium is heated at 130°–140° C. for 20 minutes. The resulting mixture is then heated to 100° C./100 microns whereupon 2,4-bis-(diphenylphosphono)-2,5-hexanediol is collected as the distillate. The distilled product is found to have a phosphorus content of 10.8%.

*Example 5*

A mixture of 117.2 grams of di-n-octadecyl phosphite, 11.4 grams of 2,5-hexanedione, and 0.2 grams of sodium is heated at 140°–150° C. for 2 hours and then at 180° C. for 20 minutes. The resulting mixture is then heated to 111° C./3 mm. to distill off any volatile contaminants. The residue comprises 2,5-bis-(di-n-octadecylphosphono)-2,5-hexanediol and is found to have a phosphorus content of 5.2%.

*Example 6*

To a solution of an equi-molar mixture of di-cyclohexyl phosphite and succinaldehyde in twice its volume of toluene there is added 0.001 mole of sodium ethoxide per mole of the phosphite. The resulting mixture is allowed to stand at 25° C. for 3 hours. Toluene is removed by distillation. The residue is then heated to give a distillate of 1,4-bis(di-cyclohexylphosphono)-1,4-butanediol.

*Example 7*

The procedure of Example 1 is repeated except that 8-chloro-2,5-decanedione (37 grams) is used in lieu of the hexanedione used. The product comprises 8-chloro-2,5-bis(diethylphosphono)-2,5-decanediol.

The polyphosphono-substituted polyols of this invention are useful for a variety of purposes. They are useful, for example, as insecticides, plasticizers, hydrocarbon oil additives, and intermediates for the preparation of other useful phosphorus containing compositions. To illustrate, 2,5-bis(diethylphosphono)-2,5-hexanediol can be dehydrated by treatment with a dehydrating agent such as sulfuric acid or phosphorus pentaoxide to 2,5-bis(diethylphosphono)-hexadiene which can be polymerized or interpolymerized with an alkyl acrylate such as n-decyl acrylate in the presence of a free radical polymerization initiator to produce a polymeric composition useful as a viscosity index improving and oxidation-inhibiting additive in lubricating oil. The diol can also be converted to the corresponding ether derivative by treatment with metallic sodium to produce a sodium alcoholate and then treatment of the sodium alcoholate with an alkyl halide such as decyl bromide. The ether derivative is useful as a plasticizer for polyvinyl chloride. Another specific illustration of the utility of the polyphosphono-substituted polyols is an improved motor fuel composition which comprises a gasoline (1 gallon) having an octane number of 100 containing incorporated therein tetra-ethyl lead (3 cc.), ethylene dibromide (3 atoms of bromine per each atom of lead), and the product of Example 2 (0.3 atom of phosphorus per atom of lead).

What is claimed is:

1. A process for preparing polyphosphono-substituted polyols which comprises reacting a hydrocarbon phosphite in which the hydrocarbon groups are inert and which is selected from the class consisting of mono-substituted and di-substituted phosphites, with an alpha, delta-di-oxo-hydrocarbon in the presence of a small amount of a basic inorganic metal compound.

2. The process of claim 1 characterized further in that the phosphite is an alkyl phosphite.

3. The process of claim 1 characterized further in that the phosphite is a diaryl phosphite.

4. The process of claim 1 characterized further in that the phosphite is a dialkyl phosphite.

5. The process of claim 1 characterized further in that the phosphite is a dialkyl phosphite wherein the alkyl radical contained from 1 to about 30 carbon atoms.

6. The process of claim 1 characterized further in that the alpha,delta-di-oxo-hydrocarbon is a diketone.

7. The process of claim 1 characterized further in that the alpha,delta-di-oxo-hydrocarbon is a dialdehyde.

8. The process of claim 1 characterized further in that the alpha,delta-di-oxo-hydrocarbon is an alkanedione having from 6 to about 30 carbon atoms.

9. The process of claim 1 characterized further in that the alpha,delta-di-oxo-hydrocarbon is 2,5-hexanedione.

10. The process of claim 1 characterized further in that the alkaline catalyst is a basic alkali metal compound.

11. The process of claim 1 characterized further in that the alkaline catalyst is sodium.

12. An alpha,delta,di-(hydrocarbon-substituted phosphono)-alpha,delta-alkanediol wherein the alkanediol radical contains from 4 to about 30 carbon atoms and wherein the hydrocarbon substituents of the phosphono radical are selected from the class consisting of alkyl of up to about 30 carbon atoms, cyclohexyl, phenyl, naphthyl, alkylphenyl, and phenyl lower alkyl.

References Cited in the file of this patent

UNITED STATES PATENTS

| | | |
|---|---|---|
| 2,579,810 | Fields | Dec. 25, 1951 |
| 2,593,213 | Stiles | Apr. 15, 1952 |

FOREIGN PATENTS

| | | |
|---|---|---|
| 969,547 | Germany | June 19, 1958 |

OTHER REFERENCES

Kosolapoff: Organophosphorus Compounds, John Wiley & Sons, New York (1950), page 5.